(12) United States Patent
Raad et al.

(10) Patent No.: US 9,944,314 B2
(45) Date of Patent: Apr. 17, 2018

(54) STEERING ASSIST SYSTEM AND RELATED METHODS

(71) Applicant: FORD GLOBAL TECHNOLOGIES, LLC, Dearborn, MI (US)

(72) Inventors: Joseph M. Raad, Farmington, MI (US); Sergio Trimboli, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 41 days.

(21) Appl. No.: 15/097,380

(22) Filed: Apr. 13, 2016

(65) Prior Publication Data

US 2017/0297611 A1    Oct. 19, 2017

(51) Int. Cl.
*B62D 6/00* (2006.01)
*B62D 5/04* (2006.01)

(52) U.S. Cl.
CPC .................. *B62D 5/0463* (2013.01)

(58) Field of Classification Search
USPC .......................................................... 701/41
See application file for complete search history.

(56) References Cited

U.S. PATENT DOCUMENTS

| | | | |
|---|---|---|---|
| 5,555,495 A * | 9/1996 | Bell | B60W 40/08 180/907 |
| 5,828,972 A | 10/1998 | Asanuma et al. | |
| 5,941,338 A | 8/1999 | Miller et al. | |
| 6,250,421 B1 | 6/2001 | Poshadlo | |
| 7,725,227 B2 | 5/2010 | Pattok et al. | |
| 7,954,593 B2 | 6/2011 | Dornhege et al. | |
| 8,798,865 B1 * | 8/2014 | Raad | B62D 6/04 340/939 |

(Continued)

FOREIGN PATENT DOCUMENTS

| | | |
|---|---|---|
| DE | 10244070 A1 | 3/2004 |
| DE | 102008056471 A1 | 11/2009 |
| WO | 2015109025 A1 | 7/2015 |

OTHER PUBLICATIONS

Lili Dong, "Active Disturbance Rejection Control for an Electric Power Assist Steering System", International Journal of Intelligent Control and Systems, vol. 15, No. 1, Mar. 18-24, 2010.

*Primary Examiner* — Tyler Paige
(74) *Attorney, Agent, or Firm* — Jones Robb, PLLC; Raymond Coppiellie

(57) ABSTRACT

A steering assist system for a vehicle comprises a steering assist module configured to determine a baseline assistance force to be applied to a steering system of the vehicle, and a transient disturbance compensation module configured to determine a transient compensation force to compensate for transient conditions that urge the vehicle to deviate from a straight path. The transient compensation force is based at least partially on the determined baseline assistance force. The system also includes a steady-state disturbance compensation module configured to determine a steady-state compensation force to compensate for steady-state conditions that urge the vehicle to deviate from the straight path, the steady-state compensation force being based at least partially on the determined baseline assistance force. Methods relate to controlling steering systems.

21 Claims, 5 Drawing Sheets

(56) References Cited

U.S. PATENT DOCUMENTS

| | | | |
|---|---|---|---|
| 2004/0133330 A1* | 7/2004 | Ono | B60T 8/172 |
| | | | 701/80 |
| 2007/0299580 A1* | 12/2007 | Lin | B60W 10/20 |
| | | | 701/41 |
| 2008/0147276 A1* | 6/2008 | Pattok | B62D 6/04 |
| | | | 701/42 |
| 2009/0192679 A1* | 7/2009 | Kobayashi | B62D 5/0463 |
| | | | 701/42 |
| 2009/0271075 A1* | 10/2009 | Hales | B62D 5/0472 |
| | | | 701/43 |
| 2010/0070135 A1* | 3/2010 | Wang | B62D 5/0472 |
| | | | 701/41 |
| 2011/0029200 A1 | 2/2011 | Shah | |
| 2014/0343790 A1* | 11/2014 | Hestermeyer | B62D 6/04 |
| | | | 701/41 |
| 2015/0025744 A1* | 1/2015 | Banno | B62D 6/04 |
| | | | 701/41 |
| 2017/0088165 A1* | 3/2017 | Raphael | B62D 15/0255 |

* cited by examiner

STEERING ASSIST SYSTEM AND RELATED METHODS

TECHNICAL FIELD

The present disclosure relates generally to steering assist systems for vehicles. In particular, the disclosure relates to systems and methods that compensate for forces applied to the steering system that may compromise the directional stability of the vehicle.

BACKGROUND

Vehicles, such as automobiles, may include a steering system operable by a driver of the vehicle to alter a direction of travel of the vehicle. Such a steering system may include a power assist unit configured to reduce the effort that must be applied by the driver to a steering control (e.g., a steering wheel) to achieve a change in direction of the vehicle. Various conditions may compromise the directional stability of the vehicle, may require the driver to make incremental or constant corrections to the direction of travel of the vehicle, and/or cause feedback through the steering wheel. Deviation from a desired path of travel may be referred to as "drift," and undesirable feedback through the steering wheel may be referred to as "pull." For example, crowned roads or strong crosswinds may temporarily cause diversion from the intended path of the vehicle. Additionally, misalignments of the vehicle steering and/or suspension components, side-to-side variations in tire inflation pressure, or other mechanical factors may cause the vehicle to pull to one side even when the driver intends to follow a straight direction of travel. Power steering systems may be configured to apply steering assist force to reduce (e.g., eliminate) drift and pull.

The directional instability due to factors such as road crown and/or crosswinds may change rapidly due to changes in road surface and environmental conditions, and the directional instability due to factors such as chassis misalignment or inconsistent tire inflation generally will not change with changes in road surface or environmental conditions. It may be desirable to separate the components of directional instability due to road surface and environmental factors from components of directional instability due to vehicle factors to enable more consistent compensation and steering feel.

SUMMARY

In accordance with various exemplary embodiments, the present disclosure provides a steering assist system for a vehicle, comprising a steering assist module configured to determine a baseline assistance force to be applied to a steering system of the vehicle and a transient disturbance compensation module configured to determine a transient compensation force to compensate for transient conditions that urge the vehicle to deviate from a straight path, the transient compensation force being based at least partially on the determined baseline assistance force. The system further includes a steady-state disturbance compensation module configured to determine a steady-state compensation force to compensate for steady-state conditions that urge the vehicle to deviate from the straight path, the steady-state compensation force being based at least partially on the determined baseline assistance force. The system includes a total disturbance compensation module configured to determine a total disturbance compensation force based on the transient compensation force and the steady-state compensation force to be applied to the steering system in addition to the baseline assistance force.

In accordance with exemplary embodiments, the present disclosure also provides a method of controlling a steering system of a vehicle, comprising, with a controller, determining a baseline steering assistance force based on information from at least one sensor, determining a transient compensation force based at least partially on the determined baseline steering assistance force, determining a steady-state compensation force based at least partially on the determined baseline assistance force, and with a steering assist device, applying a total assist force to the steering system based on the baseline assistance force, the transient compensation force, and the steady-state compensation force.

In accordance with exemplary embodiments, the present disclosure also provides a method of controlling a steering assist system, comprising, with a controller, determining a baseline assistance force, determining a transient disturbance force based at least partly on the baseline assistance force, determining a steady-state disturbance force based at least partly on the baseline assistance force, and applying an assist force to a steering system based on the baseline assistance force, the steady-state disturbance force, and the transient disturbance force.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
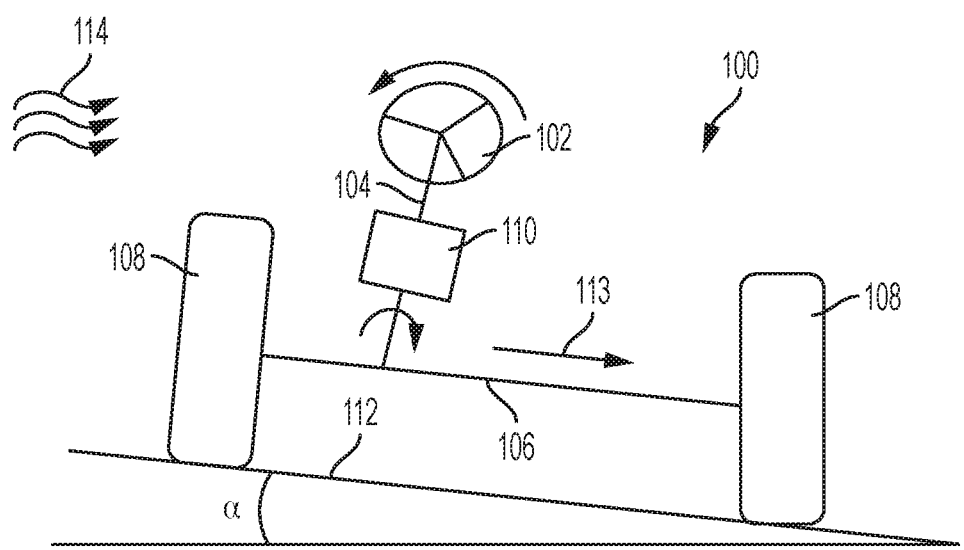
FIG. 1 is a schematic view of a steering system of a vehicle according to an exemplary embodiment of the disclosure.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. The features explained individually in the description can be mutually combined in any technically expedient manner and disclose additional embodiments of the present disclosure.

The present disclosure relates to a steering assist system configured to reduce the steering effort required to maintain a straight-ahead driving position under conditions that may adversely affect the directional stability of the vehicle. For example, systems of the disclosure may be configured to provide a counter-torque to the steering system through a steering assist system that may reduce the steering effort required to maintain a straight-ahead driving position under transient (e.g., subject to rapid change under normal driving conditions) factors that affect the directional stability of the vehicle, such as a crowned road and/or crosswinds. In addition, systems of the disclosure may reduce the steering effort required to maintain a straight-ahead driving position under steady-state (e.g., not subject to rapid change under normal driving conditions) factors such as chassis (e.g., suspension and/or steering) misalignment, variations in tire inflation, tire wear, tire characteristics, etc.

Systems of the disclosure may include separate, parallel compensation modules with individual calibrations configured to compensate for steady-state factors and transient factors. Systems of the disclosure may also include a steering-feel module configured to provide consistent haptic feedback to the driver of the vehicle. For example, the steering feel module may limit one or both of the rate and the amount of steering assist provided to the steering system to reduce (e.g., eliminate) unexpected changes in steering effort (e.g., steering feel). In addition, the steering feel module may be configured to prevent application of steering assist force when the vehicle is being serviced.

Referring now to FIG. 1, a schematic representation of a vehicle steering system 100 is shown. The steering system 100 may include a steering control operable by a driver of the vehicle, such as a steering wheel 102. The steering wheel 102 may be connected through a steering shaft 104 and mechanical linkage 106 to steered wheels 108 of the vehicle, and manipulation of the steering wheel 102 may rotate the steered wheels 108 about steering axes (not shown) defined by the geometry of the steering system 100 and/or a suspension system (not shown) of the vehicle. In an exemplary embodiment, the mechanical linkage 106 may include a rack and pinion connected via tie rods to steering knuckles on which the steered wheels 108 are rotatably mounted. In other embodiments, the mechanical linkage 106 may include, without limitation, a steering box including a worm and sector gear, associated components such as an idler arm, pitman arm, drag link, tie rods, etc.

The steering system 100 may include a steering assist unit 110 configured to provide an assist force (e.g., supplemental force) to a force input by a driver of the vehicle to the steering wheel 102. For example, the steering assist unit 110 may include an electromechanical, hydraulic, or other device configured to provide an assistance force to steer the steered wheels 108 about the steering axes consistent with a steering torque applied to the steering wheel 102 by the driver. In an exemplary embodiment, the steering assist unit 110 may comprise, for example, an electronic power assisted steering (EPAS) unit configured to apply an assist force to the steering system 100. For example, the steering assist unit 110 may apply an assistance torque to the steering shaft 104, an assistance force to the mechanical linkage 106, etc.

External conditions under which the vehicle is operated may compromise the directional stability of the vehicle, and such conditions may, in some situations, change rapidly. For example, when the vehicle is operated over a road surface 112 exhibiting a bank α, the vehicle may experience a lateral force 113 due to gravity that compromises the directional stability of the vehicle. The driver of the vehicle may be required to provide a corrective torque input to the steering wheel 102 to maintain a straight-ahead direction of travel. As the vehicle traverses the road surface 112, the bank α may abruptly increase or decrease, changing the required corrective torque input to maintain a straight-ahead direction of travel. Other transient (e.g., temporary) factors may similarly require the driver to apply a corrective torque to the steering wheel 102 to maintain a straight-ahead direction of travel. For example, crosswinds 114 may affect the directional stability of the vehicle. The strength and direction of the crosswinds 114 may also change rapidly and thus require a rapid change in corrective torque. In extreme cases, the driver may fail to apply or remove the corrective torque quickly enough to maintain the straight-ahead direction of travel, and the driver's control of the vehicle may be compromised. Transient factors tending to compromise the straight-ahead direction of travel may be characterized as "transient disturbance" factors.

Other factors that compromise the directional stability of the vehicle may be unrelated to the conditions under which the vehicle is operated, and may not be subject to rapid changes during operation of the vehicle. Such factors may be termed "steady-state" factors. For example, mechanical misalignment of the steering system 100 or suspension system of the vehicle, tires with inconsistent characteristics side-to-side due to, e.g., mismatched tires, incorrect tire inflation, or manufacturing tolerances may require the driver to provide a corrective torque to maintain a straight-ahead direction of travel. Steady-state factors that compromise the straight-ahead direction of travel may be characterized as "steady-state disturbance" factors.

Figure 2:
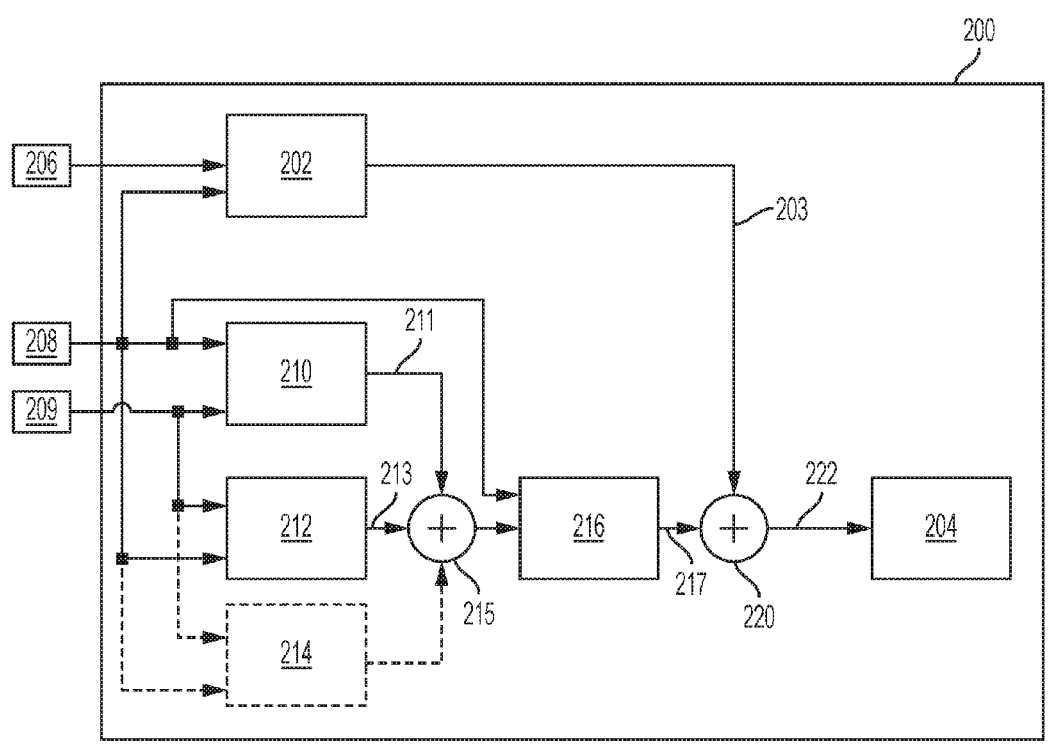
FIG. 2 is a schematic view of a steering effort compensation system according to an exemplary embodiment of the disclosure.

Referring now to FIG. 2, a schematic diagram of a control system 200 of a steering assist system 102 (FIG. 1) is shown. The control system 200 may be or include one or more electronic control units (ECUs) of the vehicle. The control system 200 may be connected to various vehicle electrical systems through a bus such as a controller area network (CAN) bus or other communications protocol. The control system 200 may include a baseline assist module 202 configured to calculate a baseline assist force signal 203 to be provided by an assist unit 204 (e.g., assist unit 110 (FIG. 1)). As an example, the baseline assist force signal 203 may be transmitted to the assist unit 204, responsive to which the assist unit 204 may generate a baseline assistance force to facilitate steering inputs from the driver of the vehicle to carry out directional changes in the vehicle's path of travel. The baseline assist module 202 may receive inputs relating to driver manipulation of the steering wheel 102 (FIG. 1). For example, the baseline assist module 202 may receive an input from a steering wheel torque sensor 206 configured to sense a torque applied to the steering wheel 102 by the driver. The baseline assist module 202 may also receive inputs relating to various operational parameters of the vehicle. For example, the baseline assist module 202 may receive inputs from one or more vehicle sensors 208. Such inputs may include data related to one or more of steering wheel angle, vehicle speed, vehicle yaw rate, lateral acceleration, and other operational parameters. The baseline assist module 202 may calculate the baseline assist force signal 203 based on the inputs related to driver steering inputs and the operational parameters of the vehicle, and may use any algorithms, routines, inputs, etc. associated with conventional steering assist systems.

The control system 200 may include one or more compensation modules configured to determine a force to be applied by the assist unit 204 to counteract factors that may compromise the directional stability of the vehicle. In other words, the one or more compensation modules may be configured to provide a signal to the assist unit 204 to apply a compensating force to the steering system 100 (FIG. 1) that reduces (e.g., eliminates) the necessity of the driver applying a corrective torque to the steering wheel 102 to maintain a straight-ahead direction of travel of the vehicle. The control system 200 may include multiple compensation modules, each one having a calibration configured to provide a compensation signal for a different category of factors that compromise directional stability. Such calibration may include specific boundary conditions, initial conditions, sampling rate, or other programming or control of an integrator module 230 of the compensation module as described below in connection with FIG. 3. Additionally or alternatively, such calibration may include the presence and configuration of filters, such as high-pass filters, low pass filters, and combinations thereof.

Referring still to FIG. 2, a compensation module 210 may be configured to provide (e.g., generate, determine) a signal to the assist unit to compensate for a transient disturbance factor, such as a disturbance resulting from a road crown, a crosswind, turbulence due to other vehicles on the road, or other temporary (e.g., environmental) factors affecting the straight-line stability of the vehicle. Accordingly, the compensation module 210 may be characterized as a transient compensation module. The transient compensation module 210 may receive signals from the one or more vehicle sensors 208 relating to vehicle speed, steering wheel angle, yaw rate, lateral acceleration, etc. In some embodiments, the transient compensation module 210 may receive a signal 209 related to the baseline assist force signal 203 from the baseline assist module 202. In some embodiments, the signal 203 may be fed directly to the transient compensation module 210 as the signal 209. Additionally or alternatively, the compensation module 210 may receive a signal related to a torque applied to the steering wheel 102 (FIG. 1) by the driver. For example, the compensation module 210 may receive a signal from the torque sensor 206 that generates a signal related to the torque applied by the driver to the steering wheel 102. As discussed in greater detail in connection with FIG. 3 below, the compensation module 210 may generate a transient compensation signal 211. The transient compensation signal 211 may be ultimately transmitted to the assist unit 204, and a force applied by the assist unit 204 responsive to the transient compensation signal 211 may reduce (e.g., eliminate) the necessity for the driver to apply a torque to the steering wheel 102 to maintain a straight-ahead direction of travel.

In an exemplary embodiment, the compensation module 210 may be calibrated to compensate for transient disturbance factors and may be characterized as a transient compensation module 210, while one or more additional compensation modules, such as compensation module 212, may be calibrated to compensate for steady-state disturbance factors. Accordingly, the compensation module 212 may be characterized as a steady-state compensation module. The steady-state compensation module 212 may receive the same inputs as compensation module 210, e.g., signals related to torque applied to the steering wheel 102 (FIG. 1) by the driver and/or signals related to the baseline assist signal 203 generated by the baseline assist module 202. The compensation module 212 may generate a steady-state compensation signal 213. The steady-state compensation signal 213 may be transmitted ultimately to the assist unit 204, responsive to which the assist unit 204 may apply an assist force that lessens (e.g., eliminates) the necessity for the driver to apply a torque to the steering wheel 102 to maintain a straight-ahead direction of travel.

In some embodiments, multiple compensation modules may be used to compensate for one or both of the transient disturbance factors and the steady-state disturbance factors. For example, an additional compensation module 214 may be included and may be configured similarly to module 210 to compensate for transient disturbance factors. Alternatively, the additional compensation module 214 may be configured similarly to module 212 to compensate for steady-state disturbance factors. Any number of compensation modules may be used to compensate for each of the transient disturbance factors and the steady-state disturbance factors. For example, while FIG. 2 illustrates only additional compensation module 214, multiple additional compensation modules may be included and calibrated such that there are multiple compensation modules calibrated to compensate for the transient disturbance factors, and multiple compensation modules calibrated to compensate for the steady-state disturbance factors.

The transient compensation signal 211 generated by the transient compensation module 210 and the steady-state compensation signal 213 generated by the steady-state compensation module 212 may be summed at summation node 215 and transmitted to an assist force modifier module 216. The assist force modifier module 216 may be configured to ensure that haptic feedback (e.g., steering feel) transmitted through the steering wheel 102 (FIG. 1) to the driver is acceptably consistent (e.g., uniform) during operation of the vehicle, as discussed in greater detail below in connection with FIG. 4. In addition, the assist force modifier module 216 may be configured to prevent application of compensatory steering assist force under conditions in which such force may be unnecessary, undesirable, or unsafe, such as when the vehicle is traveling slowly or being serviced.

An output compensation signal 217 from the assist force modifier module 216 may be summed with the baseline assistance force signal 203 from the baseline assistance module 202 at summation node 220. A combined assistance force signal 222 may be transmitted to the steering assist unit 204 (e.g., steering assist unit 110 (FIG. 1)), and the steering assist unit 204 may apply an assistance force to the steering system 100 (FIG. 1).

Figure 3:
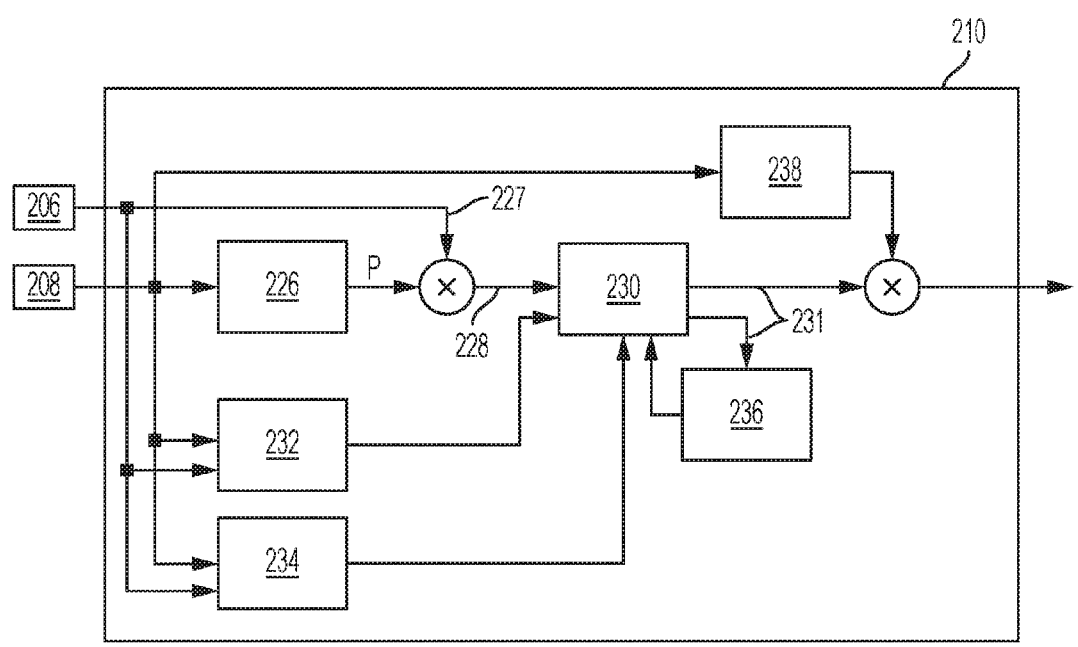
FIG. 3 is a schematic view of a compensation module according to an exemplary embodiment of the disclosure.

Referring now to FIG. 3, the contents of the transient compensation module 210 are shown in greater detail in schematic view. While the transient compensation module 210 is specifically shown in FIG. 3, the steady-state compensation module 212 and any other compensation modules (such as the additional compensation module 214) may include similar or identical contents, and differences in functionality (e.g., generation of compensation signals to address different categories of disturbance factors) may be created by different calibrations, as discussed below.

The compensation module 210 may include a directional confidence module 226 configured to calculate a probability that the driver intends to direct the vehicle along a straight path. For example, a value of 0 may indicate no likelihood that the driver intends the vehicle to follow a straight path, while a value of 1 may represent a certainty that the driver intends the vehicle to follow a straight path. The directional confidence module 226 may receive signals from the one or more vehicle sensors 208 including one or more of a steering wheel angle sensor, a lateral acceleration sensor, a yaw rate sensor, a longitudinal acceleration sensor, or any other sensor configured to provide information relating to operational parameters of the vehicle that may serve as indicators of the driver's intended path. For example, a probability that the driver intends to direct the vehicle along a straight path may be expressed as a function of one or more of the operational parameters. In other words, a probability that the driver intends to direct the vehicle along a straight path may be generated (e.g., calculated) by multiplying factors associated with individual operational parameters of the vehicle. For example, a probability P that the driver intends to direct the vehicle along a straight path may be generated with a function of the following general form in equation 1:

$$P=f1(\text{input } 1)*f2(\text{input } 2)*f3(\text{input } 3) \ldots fi(\text{input } i) \quad (1)$$

In equation 1, P is a probability value between 0 and 1, and f1 through fi are functions of various inputs 1 through i, which may include one or more of steering wheel angle, lateral acceleration, yaw rate, longitudinal acceleration, etc. The functions f1 through fi are multiplied to produce the probability value P. As a non-limiting example, the functions f1 through fi may be or include relative weights assigned to the inputs 1 through i.

The probability value P is multiplied by a signal 227 relating to a torque applied by the driver to the steering wheel 102 (FIG. 1) (e.g., a signal from a steering wheel torque sensor 206) to create a weighted driver torque signal 228 that includes the likelihood that a torque applied by the driver (and/or an associated assist signal generated by the baseline assistance module 202) is intended to counteract a factor compromising the straight line stability of the vehicle. In other words, if the probability value P is high (e.g., close to 1), the torque applied by the driver is likely intended to counteract a disturbance force, and the weighted driver torque signal 228 will be close to or equal to the torque signal 227. Conversely, if the probability value is low (e.g., close to 0), the torque applied by the driver (and/or associated assist signal generated by the baseline assistance module 202) is more likely intended to cause a change in direction of the vehicle, and the weighted driver torque signal 228 will be significantly less than the torque signal 227.

The weighted driver torque signal 228 may be transmitted to an integrator module 230. The integrator module 230 may provide an output signal 231 that represents (e.g., is an estimate of, a measurement of, etc.) the disturbance factor to be compensated for by the compensation module 210. In an exemplary embodiment, the integrator module 230 may be a discrete time integrator of the form shown in equation 2:

$$x(k+1)=x(k)+b(k)*u(k) \quad (2)$$

In equation 2, x(k) represents the state of the integrator module 230 at a generic time instant k, u(k) represents the weighted torque signal 228, b(k) represents an integrator factor calculated by an integrator factor module 232, and x(k+1) represents the state of the integrator module 230 at time instant k+1. The integrator factor module 232 may calculate the integrator factor b(k) based on one or more inputs related to torque applied to the steering wheel, compensating torque applied by the power assist unit, and operating conditions of the vehicle such as steering wheel angle, yaw rate, lateral acceleration, vehicle speed, longitudinal acceleration, etc. The integrator factor b(k) may adjust the level of compensation ultimately provided by the transient compensation module 210 (or the steady-state compensation module 212) based on the operating conditions of the vehicle provided as inputs to the integrator factor module 232. In other words, the integrator factor b(k) may be calculated to provide an appropriate level of compensation force given the operating conditions of the vehicle.

Initial conditions for the integrator module 230 may be set by an initial condition module 234. The initial condition module 234 may generate (e.g., calculate, estimate) initial conditions for input to the integrator module 230 based on at least one of a torque applied to the steering wheel and the calculated baseline assistance torque 203 and/or a total assistance torque (i.e., the calculated baseline torque and the calculated compensation torque from compensation modules 210 and 212). The initial conditions may represent a state x(k) of the integrator module 230 upon vehicle start, upon a periodic reset of the integrator module 230 during operation of the vehicle, etc.

An output 231 from the integrator 230 may be multiplied by an output from a secondary probability module 238. The secondary probability module 238 may weight the output from the integrator 230 based on various inputs related to operational parameters of the vehicle, similar to the directional confidence level calculation module 226 described above. The secondary probability module 238 may modify the output 231 of the integrator based on a probability calculated by the secondary probability module 238 that the driver intends to direct the vehicle in a straight path. Thus, if the probability value is low, indicating that the driver does not intend to follow a straight path, the applied corrective torque will be correspondingly smaller.

One or more calibration aspects of the integrator module 230 associated with the transient compensation module 210 may be different from the calibration aspects of the integrator module associated with the steady-state compensation module 212. For example, aspects of the calibration that may differ may include a sampling rate of the integrator module 230 (i.e., the time interval between generic time instants k), the initial conditions supplied by the initial condition module 234, and other aspects of the calibration. As a non-limiting example, a relatively more frequent sampling time may resolve transient disturbance conditions, while a relatively less frequent sampling time may isolate steady-state disturbance conditions. Additionally, some aspects of the calculation of the probability P in directional confidence level calculation module 226 may differ between the transient compensation module 210 and the steady-state compensation module 212 may vary. For example, the particular inputs to the directional confidence level calculation module 226 may differ between the transient compensation module 210 and the steady-state compensation module 212. Additionally or alternatively, any one, or any combination of, the functions f1 through fi may differ between the transient compensation module 210 and the steady-state compensation module 212.

The output 231 of the integrator 230 may also be transmitted to a memory module 236. In an exemplary embodiment, the state x(k) of the integrator may be stored in the memory module 236 such that the state of the integrator 230 at a particular time k may be retrieved for later use. In some embodiments, the memory module 236 may function differently within the transient compensation module 210 compared to the steady-state compensation module 212. For example, the integrator state x(k) at a time instant k when the vehicle is shut down may be stored within the memory module 236 of the steady-state compensation module 212. The integrator state x(k) may be retrieved upon the next ignition cycle of the vehicle. Such functionality may provide consistent compensation for steady-state factors, such as mechanical misalignments and inconsistencies in tire inflation and/or tire characteristics, which may not change appreciably between cycles of the ignition and may remain relatively consistent over time. In some embodiments, the contents of the memory module 236 may be reset (e.g., by disconnecting the vehicle battery, by connecting a diagnostic tool to the vehicle electronics system, etc.) by a vehicle service technician upon service events such as an alignment, tire replacement, etc. Additionally or alternatively, the memory module 236 may "relearn" the steady-state vehicle characteristics, with or without reset by a technician.

In contrast, in some exemplary embodiments, the memory module 236 of the transient compensation module 210 may be configured to purge the last integrator state x(k) upon ignition shutoff, as transient conditions such as road bank and crosswinds may or may not be present upon restart of the vehicle. Alternatively, the last integrator state x(k) may be retained in the memory and applied at startup, and the transient compensation module 210 may "relearn" the present conditions during operation.

Figure 4:
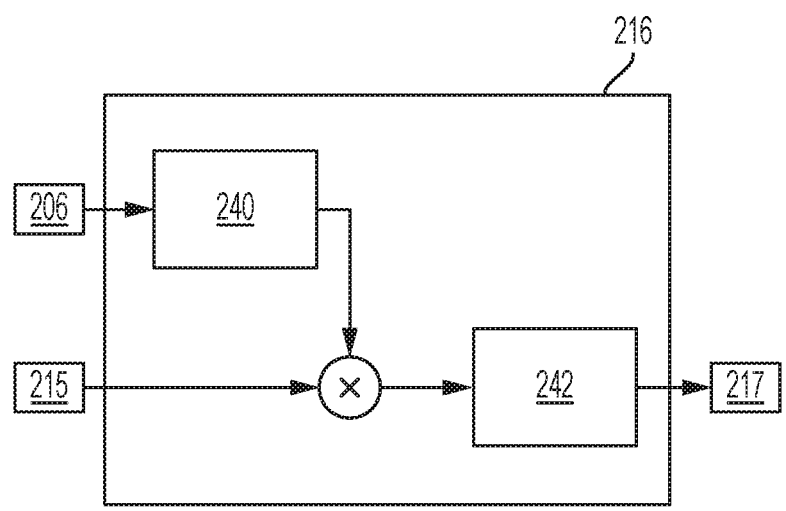
FIG. 4 is a schematic view of a steering feel module according to an exemplary embodiment of the disclosure.

As described above in connection with FIG. 2, the output from the transient compensation unit 210 and the steady-state compensation unit 212 may be summed at 215 and transmitted to an assist force modifier module 216. Referring now to FIG. 4, the assist force modifier module 216 may include a safety interlock module 240 configured to prevent application of a compensation force by the steering assist system 204 when application of such force may be a safety hazard, e.g., when the vehicle is raised on a lift for servicing. In one embodiment, a signal from the at least one sensor 208 (FIG. 2) may be transmitted to the safety interlock module 240. For example, a signal representing the vehicle speed may by transmitted to the safety interlock module 240, and application of compensation force may be prevented below a threshold vehicle speed by multiplying a signal from the safety interlock module 240 with the assist signal 215. If the safety interlock module 240 indicates unsafe conditions for applying a compensation torque, the assist signal 215 may be multiplied by a "zero" signal from the safety interlock module 240 to prevent application of the compensation force.

The assist force signal as modified by the safety interlock module 240 may be transmitted to a steering feel module 242. The steering feel module 242 may be configured to ensure that haptic feedback (e.g., "steering feel") experienced by the driver is predictable and consistent. For example, in some embodiments, the steering feel module 242 may include one or both of a saturation limiter and a rate limiter. The saturation limiter may limit the total assist force applied to the steering system 100 (FIG. 1) to a particular predetermined level. The rate limiter may limit the rate at which the total assist force applied to the steering system 100 increases or decreases, to slow the rapid application or removal of assist force, which may otherwise cause unexpected changes in steering feel. The output 217 from the assist modifier module 216 may be summed with the output 203 (FIG. 2) from the baseline assist force module 202 (FIG. 2) and transmitted to the steering assist unit 204 (FIG. 2), which may apply the assist force indicated by the summed signal as discussed in connection with FIG. 2. The output 217 from the assist modifier module 216 may be based on a summation of the baseline assist force signal 203, the transient compensation signal 211, and the steady-state compensation signal 213, and the applied assist force may provide compensation for any transient disturbance factors and any steady-state disturbance factors, in addition to the baseline assist force.

Figure 5:
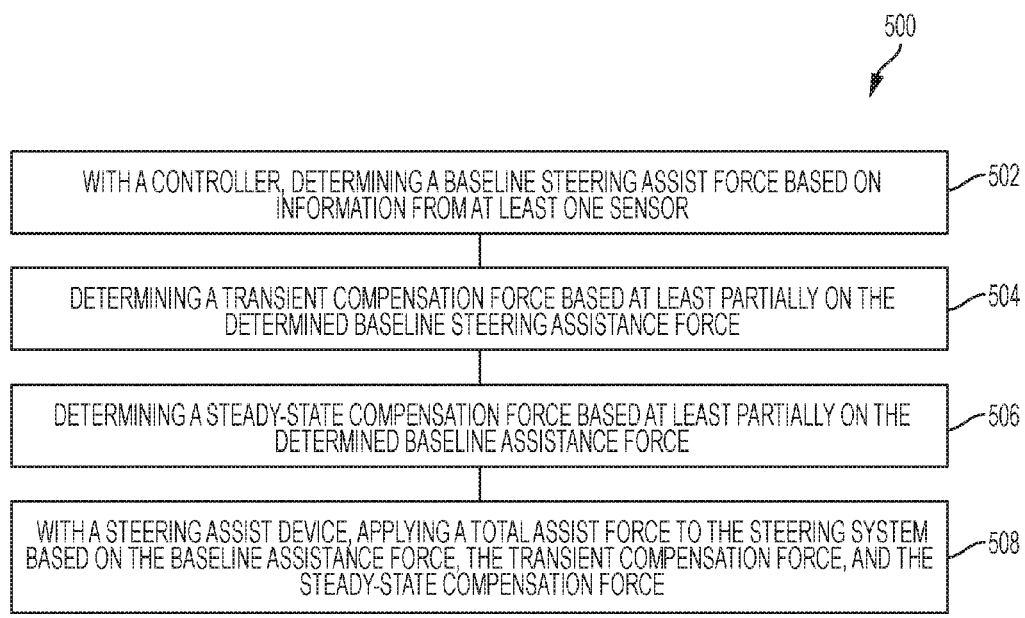
FIG. 5 is a flow chart showing a method of providing steering feel compensation according to an exemplary embodiment of the disclosure.

FIG. 5 is a flowchart showing a method 500 of controlling a steering system of a vehicle. The method includes, with a controller, determining a baseline steering assist force based on information from at least one sensor at action 502. At action 504, the method includes determining a transient compensation force based at least partially on the determined baseline steering assistance force. At action 506, the method includes determining a steady-state compensation force based at least partially on the determined baseline assistance force. At action 508, the method includes, with a steering assist device, applying a total assist force to the steering system based on the baseline assistance force, the transient compensation force, and the steady-state compensation force.

The exemplary systems and methods described herein can be performed under the control of a processing system executing microprocessor-readable codes embodied on a microprocessor-readable recording medium or communication signals transmitted through a transitory medium. The microprocessor-readable recording medium is any data storage device that can store data readable by a processing system, and includes both volatile and nonvolatile media, removable and non-removable media, and contemplates media readable by a database, a microprocessor, and various other network devices.

Examples of the microprocessor-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiments described herein be considered as exemplary only.

What is claimed is:

1. A steering assist system for a vehicle, comprising:
    a steering assist module configured to determine a baseline assistance force to be applied to a steering system of the vehicle;
    a transient disturbance compensation module configured to determine a transient compensation force to compensate for transient conditions that urge the vehicle to deviate from a straight path, the transient compensation force being based at least partially on the determined baseline assistance force;
    a steady-state disturbance compensation module configured to determine a steady-state compensation force to compensate for steady-state conditions that urge the vehicle to deviate from the straight path, the steady-state compensation force being based at least partially on the determined baseline assistance force; and
    a total disturbance compensation module configured to determine a total disturbance compensation force based on the transient compensation force and the steady-state compensation force to be applied to the steering system in addition to the baseline assistance force.

2. The steering system of claim 1, wherein the steering assist module is configured to determine the baseline assistance force based at least in part on a signal from at least one sensor.

3. The steering assist system of claim 2, wherein the steering assist module is configured to determine the baseline assistance force based at least in part on a torque input signal from a torque sensor configured to generate a signal related to a torque input at a steering control.

4. The steering assist system of claim 2, wherein the at least one sensor comprises one or more of a vehicle speed sensor, a yaw rate sensor, and a lateral acceleration sensor.

5. The steering assist system of claim 1, wherein the transient conditions include at least one of a profile of a road surface over which a vehicle is operated and a wind acting on the vehicle.

6. The steering assist system of claim 1, wherein the steady-state conditions include at least one of vehicle chassis misalignment, vehicle tire rolling resistance, vehicle tire inflation pressure, and vehicle tire characteristics.

7. The steering assist system of claim 1, further comprising a steering feel module configured to maintain a consistent haptic feedback at a steering control regardless of the level of the total disturbance compensation force applied by the steering assist device.

8. The steering assist system of claim 7, wherein the steering feel module is configured to limit a rate at which the total disturbance compensation force applied by the steering assist device increases or decreases.

9. The steering assist system of claim 7, wherein the steering feel module is configured to limit a total value of the total disturbance compensation force applied by the steering assist device.

10. A method of controlling a steering system of a vehicle, comprising:
    with a controller:
        determining a baseline steering assistance force based on information from at least one sensor;
        determining a transient compensation force based at least partially on the determined baseline steering assistance force;
        determining a steady-state compensation force based at least partially on the determined baseline assistance force; and
    with a steering assist device, applying a total assist force to the steering system based on the baseline assistance force, the transient compensation force, and the steady-state compensation force.

11. The method of claim 10, wherein determining a baseline steering assistance force based on information from the at least one sensor comprises determining a baseline steering assistance force based at least in part on a signal from a torque sensor configured to generate information related to a torque applied to a steering wheel of the vehicle.

12. The method of claim 10, wherein determining a baseline steering assistance force based on information from at least one sensor comprises determining a baseline assistance force based at least in part on a signal from a steering wheel angle sensor configured to generate information related to an angle of a steering wheel of the vehicle.

13. The method of claim 10, wherein determining a baseline steering assistance force based on information from at least one sensor comprises determining a baseline steering assistance force based at least in part on a signal from at least one sensor configured to generate information related to at least one of vehicle speed, vehicle yaw rate, and vehicle lateral acceleration.

14. The method of claim 10, wherein at least one of determining a transient compensation force and determining a steady-state compensation force comprises determining a confidence interval of an intended path of the vehicle.

15. The method of claim 14, wherein determining a confidence interval of an intended path of the vehicle comprises determining a confidence interval of an intended path of the vehicle based on at least one of steering wheel angle, lateral acceleration of the vehicle, yaw rate of the vehicle, and longitudinal acceleration of the vehicle.

16. The method of claim 10, wherein applying a total assist force to the steering system based on the baseline assistance force, the transient compensation force, and the steady-state compensation force comprises applying a total assist force with a magnitude equal to a sum of the baseline assistance force, the transient compensation force, and the steady-state compensation force.

17. The method of claim 10, wherein determining the transient compensation force comprises determining a transient compensation force to compensate for a transient disturbance force resulting from at least one of road surface profile and a wind acting on the vehicle.

18. The method of claim 10, wherein determining a steady-state compensation force comprises determining a steady-state compensation force resulting from at least one of chassis misalignment, vehicle tire rolling resistance, vehicle tire inflation pressure, and vehicle tire characteristics.

19. The method of claim 10, further comprising storing information related to the steady-state disturbance force in a microprocessor-readable memory operatively connected to the controller.

20. A method of controlling a steering assist system, comprising:
with a controller:
determining a baseline assistance force;
determining a transient disturbance force based at least partly on the baseline assistance force; and
determining a steady-state disturbance force based at least partly on the baseline assistance force; and
applying an assist force to a steering system based on the baseline assistance force, the steady-state disturbance force, and the transient disturbance force.

21. A steering assist system for a vehicle, comprising:
a steering assist device configured to apply an assist force to a steering column of a vehicle; and
a controller configured to determine a baseline assistance force, a transient compensation force, and a steady-state compensation force,
wherein the controller is further configured to instruct the steering assist device to apply a total disturbance compensation force based on the baseline, transient, and steady-state forces.

* * * * *